Feb. 11, 1936.  S. F. ARBUCKLE ET AL  2,030,620
LIGHTING SYSTEM AND APPARATUS
Filed May 31, 1932  3 Sheets-Sheet 1
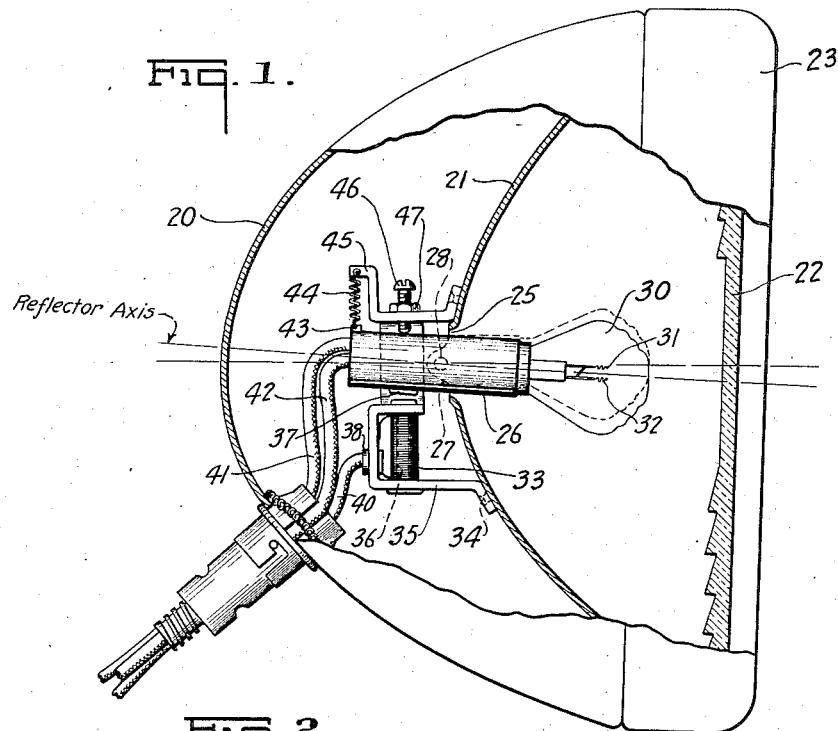
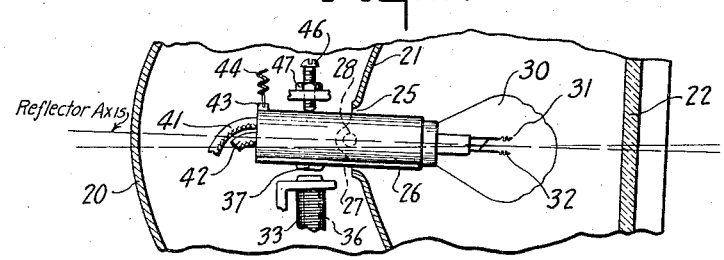
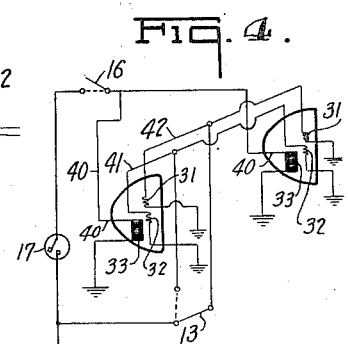
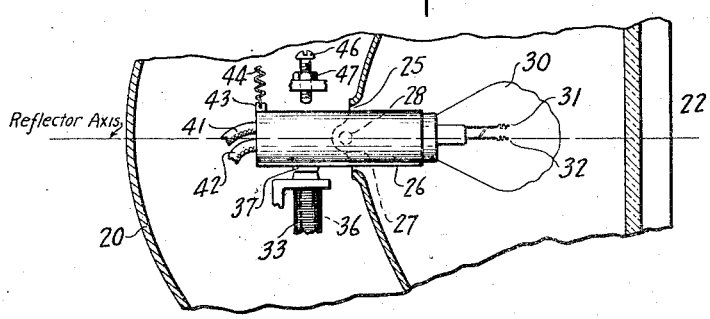
INVENTORS
Samuel F. Arbuckle
BY Guy H. Coulter
Braselton, Whitcomb Davies
ATTORNEYS

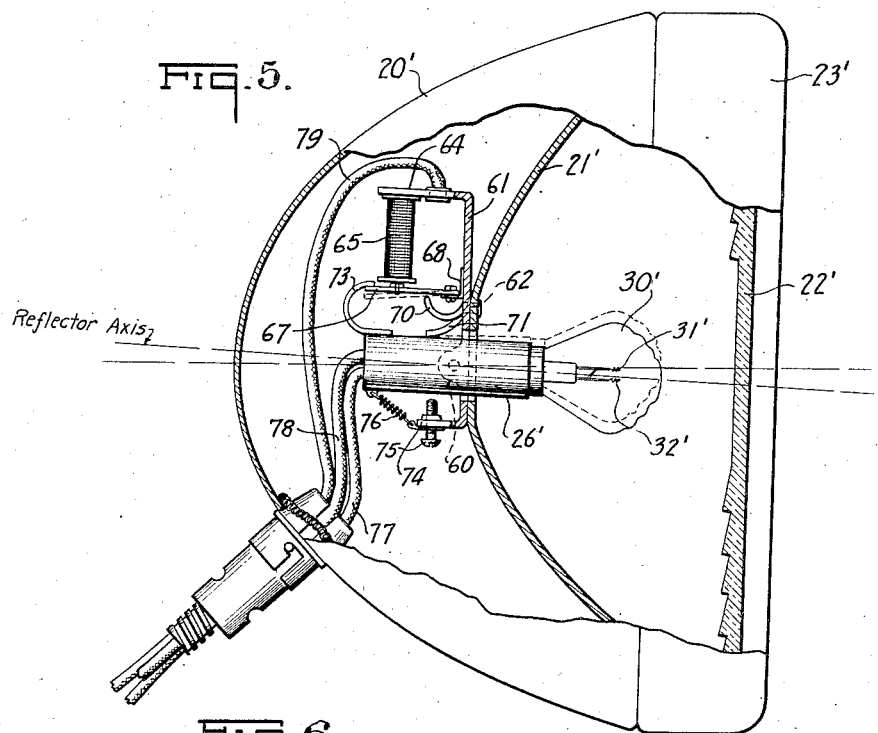
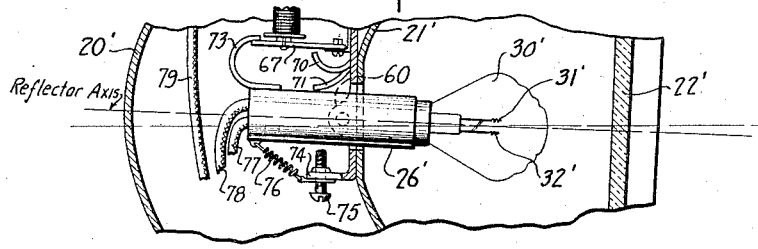
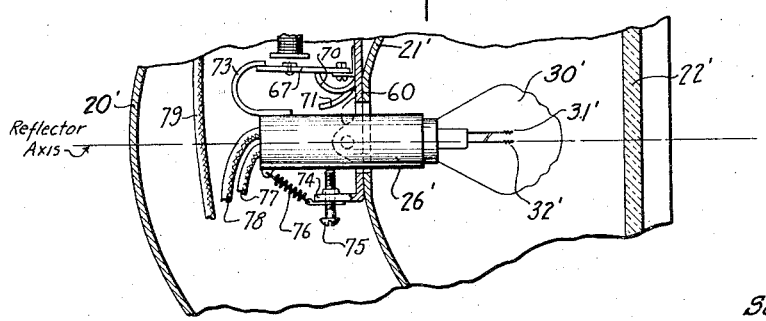

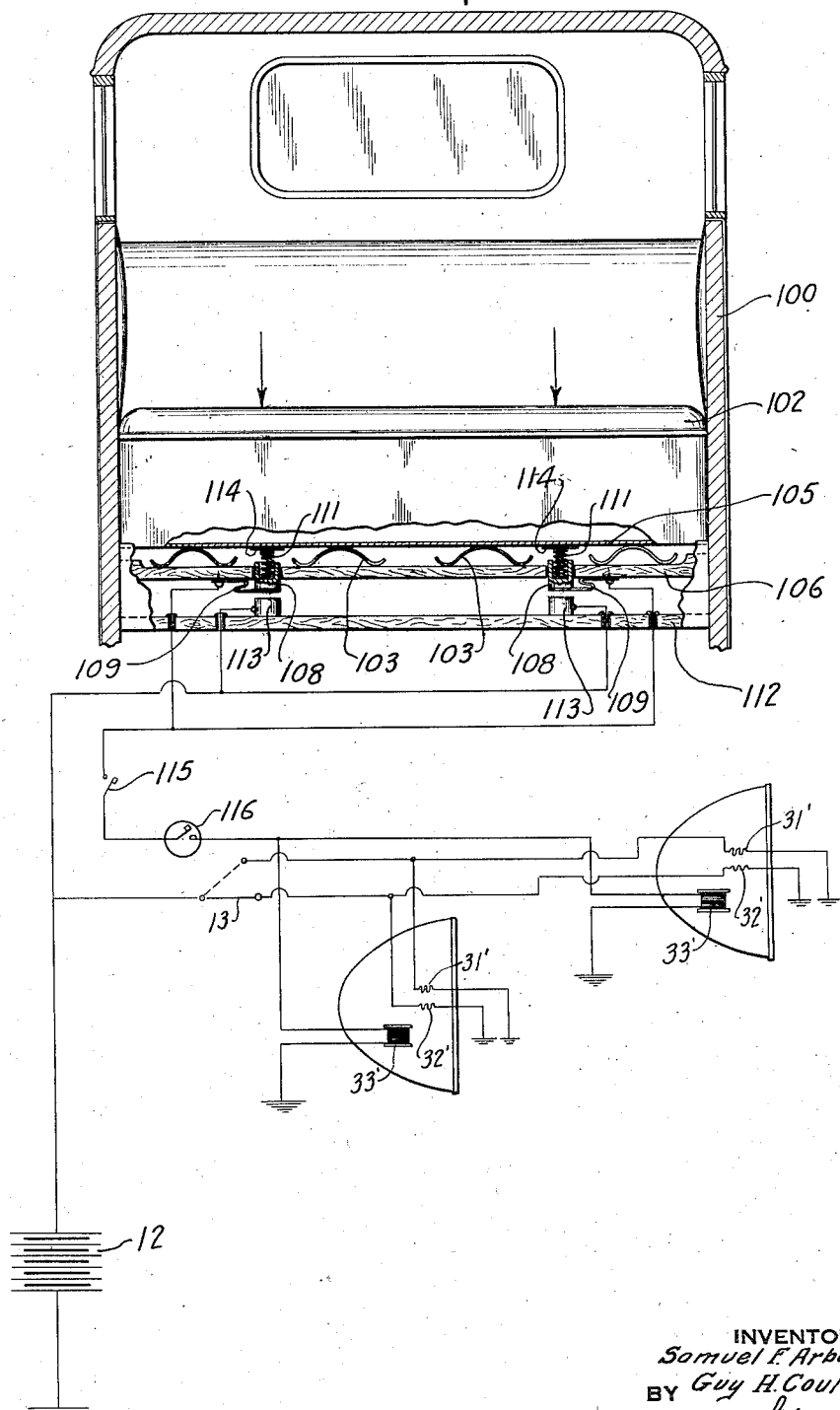

Patented Feb. 11, 1936

2,030,620

UNITED STATES PATENT OFFICE 2,030,620

LIGHTING SYSTEM AND APPARATUS

Samuel F. Arbuckle and Guy H. Coulter, Highland Park, Mich., assignors to United Lens Corporation, Detroit, Mich., a corporation of Delaware Application May 31, 1932, Serial No. 614,384

3 Claims. (Cl. 240—7.1)

This invention relates to illuminating means and more particularly to headlamps of the type usable in connection with automotive vehicles for producing satisfactory road illumination especially eliminating glare.

In providing illumination for movable vehicles several desirable requisites should be considered. For example, a light provided on a vehicle should not cause glare, that is, a concentrated intensity of illumination at an undesirable direction makes it difficult for an observer such as a pedestrian or an approaching driver to see, thus endangering both the observer and the driver of the vehicle. Another consideration is that the illumination be provided commensurate with the speed at which the vehicle is travelling, it being important to have a light at a greater distance from the vehicle when the same is moving at a high rate of speed than is desirable when the vehicle is moving at a comparatively slow rate of speed. Still another consideration is that the loading of the vehicle affects the direction of light projected, as for example in an unloaded vehicle the light should preferably not project above a horizontal line on a plane through the center portion or focus of the headlamps to conform to the laws at present relating to vehicle illumination, whereas, in the same vehicle loaded, the headlamps will be tilted throwing the light above the horizontal, and it is desirable to provide means to eliminate or minimize this troublesome condition.

A simple and effective illuminating means is provided which emits a long concentrated driving beam for use in long distance or high speed driving and alternately a depressed beam for illuminating the road nearer the vehicle, the latter beam being so directed as to effectively eliminate glare in the eyes of approaching drivers or pedestrians but so arranged as to also illuminate adjacent roadway to a sufficient degree of intensity of illumination to provide satisfactory lighting, the illuminating system being arranged to compensate for the directional change in the light projected from the headlamps when the vehicle is "loaded" in contradistinction to an "unloaded" condition of the vehicle.

The invention embraces the provision of simple and effective means for producing independently usable light beams coupled with an arrangement for simultaneously changing the direction of such beams to compensate for "loaded" or "unloaded" relative positions of the vehicle body with respect to its supporting structure.

The invention comprehends the provision of a simple and effective means for changing the relative position or relationship existing between the independently usable filaments and the light reflecting medium to effect a change in the direction of the projected light beams.

An object of the invention is the provision of an arrangement of movably supported light sources for changing the coacting relationship between the reflecting medium and the light sources, the invention further embracing the provision of simple and effective electro-responsive means for effecting the desired change in the position of the light emitting means to compensate for relative variations in loading of the vehicle.

A further object of the invention is the provision of vehicle lighting apparatus wherein the directional characteristics of the light beams may be automatically altered dependent upon the static load factor of the vehicle.

Further objects and advantages are within the scope of this invention, such as relate to the arrangement, operation and function of the related elements of the structure, to various details of construction and to combinations of parts, elements per se, and to economies of manufacture and numerous other features, as will be apparent from a consideration of the specification and drawing of a form of the invention which may be preferred, in which:

Figure 1 is a vertical sectional view through a headlamp incorporating means for changing the relative position between the light sources and the light reflecting medium;

Figure 2 is a fragmentary sectional view showing various parts of the structure shown in Figure 1 and illustrating one form of filament positioning with respect to the reflecting medium and the axis of the latter for obtaining light beams having particular directional characteristics;

Figure 3 is a view similar to Figure 2 showing another position of filaments with respect to the light reflecting medium and the axis thereof for obtaining beams having different directional characteristics;

Figure 4 is a diagrammatic view illustrating a typical headlamp lighting circuit for accomplishing the results attainable through the utilization of our invention.

Figure 5 is a view similar to Figure 1 showing a form of the invention illustrating a different filament positioning and the relative location of the filament shifting means of the invention;

Figure 6 is a fragmentary view similar to Figure 2 showing one position of the filaments with respect to the light projecting means;

Figure 7 is a view similar to Figure 6 showing another position of the filaments with respect to the light projecting means;

Figure 8 is a sectional view through a vehicle body illustrating a vehicle seat and an arrangement for energizing electro-responsive elements of our invention under certain load conditions.

As a practical embodiment, an arrangement of the invention is illustrated as incorporated in the headlamps and illuminating systems of the character particularly employed with automotive vehicles, but it is to be understood that the invention may be incorporated in any type of illuminating means wherein the same may be found to be applicable.

One form of this invention for compensating for this elevation of light beam due to loading of the vehicle is illustrated in Figure 1 in which the headlamp comprises an enclosing casing 20 within which is positioned a parabolic or substantially parallelizing reflector or light reflecting medium 21 in front of which is positioned a lens or substantially transparent cover 22 contained within an escutcheon member 23, the latter being secured by any suitable means (not shown) to the casing 20. The apex or heel of the reflector is provided with an opening 25 through which projects a socket member 26 suitably pivoted to ears 27 preferably forming a part of the reflector 21 by means of a pivot pin 28. The socket 26 is adapted to support a lamp bulb 30 within which is preferably positioned a plurality of separately energizable lamp filaments 31, 32 for producing the depressed and distance beams hereinbefore described.

Preferably secured to the reflector 21 as by spot welding 34 or other suitable means is a bracket 35 provided with openings within which is positioned a solenoid core 36, and associated winding 33, the upper extremity of the core terminating in juxtaposition to a projection 37 of magnetic material acting as an armature formed upon the lower surface of the socket member 26, either integral therewith or secured by any suitable means thereto. The bracket 35 is also provided with openings adapted to accommodate insulating bushings 38 through which passes the lead wire 40 connected to the winding 33 of the solenoid.

The rear extremity of the socket member 26 is provided with an ear portion 43 which is connected by means of a spring or other resilient member 44 to a projecting member 45 preferably forming an integral part of the bracket member 35. The portion of the bracket 35 immediately above the socket member 26 is formed with a threaded opening adapted to receive an adjusting screw or stop member 46 which may be fixedly secured in adjusted position by means of a lock nut 47, the screw 46 serving to limit the tilting movement of socket 26 for the purpose of definitely positioning the lamp bulb 30 and filaments with respect to the reflector.

The plurality of separately energizable filaments 31 and 32 for producing the depressed and driving beams hereinbefore described are energized from a suitable source of energy by means of lead wires 41 and 42 suitably connected to a storage battery 12 through the use of a selector switch 13 adapted to be moved to establish circuits for selectively energizing either set of filaments. The solenoid windings 33 are connected by lead wires 40 to the storage battery or source of energy, the circuit adapted to be closed or opened by means of a manual switch 16. Intercalated in the circuit between the switch 16 and the source of energy or storage battery 12 is preferably a second switch 17 actuated by the ignition switch, the latter being controlled by a suitable locking device of usual construction (not shown). The use of the supplemental switch 17 simultaneously actuated by the ignition controlling circuit renders it impossible to shift the bulb and filaments when the ignition circuit is ineffective. This supplemental switch may be dispensed with, without departing from the spirit of this invention. It should be noted that the filament circuit, as well as the solenoid circuits use the ground as a return medium to the battery 12 which is also grounded.

In the embodiment of the invention above described with the car in substantially unloaded position it should be noted that the type of headlamp disclosed is initialy tilted downwardly so that the reflector axis is inclined downwardly with respect to a line parallel to the roadway and that the lower filament 32 bears a relation with respect to the reflector axis and focal point so that the rays projected from the reflector emanating from the lower filament 32 will preferably not be directed above a horizontal position, which is in compliance with the present day legal requirement with respect to glare conditions or requirements for a driving beam. The upper limits of the depressed beam or light emanating from the upper filament 31 strikes the roadway nearer to the vehicle than the driving beam.

Should the vehicle be substantially fully loaded, the vehicle body will be moved with respect to the roadway, the load substantially compressing the rear springs and effecting an upward tilt to the headlamp causing a corresponding degree of upward tilt to the light projected from the headlamps so that the upper limits of the driving and depressed beams have been elevated. In this condition, the light projected is somewhat objectionable due to the presence of a certain degree of glare, as well as the beam being in contravention to the legal requirements. In order to alleviate this condition through the use of the invention, the means hereinbefore described for changing the relative positions of the filaments with respect to the reflector is brought into use. Assuming that the ignition switch 17 is in closed circuit position, the switch 16 is moved to closed circuit position causing energization of the solenoid circuit thus attracting the armature 37, and causing a tilting movement of the lamp socket, lamp bulb and filaments contained therein, moving the same from the position shown in Figure 2 to the position shown in Figure 3 wherein both filaments are elevated substantially above the position illustrated in Figure 2. The movement and adjustment is such that the lower filament 32 will be substantially in the focal axis of the reflector while the filament 31 will be correspondingly raised above the axis. Thus, the energization of the solenoid circuit and the windings 33 causing the movement of the filaments results in a shifting of the beams so that the line of the maximum upper limit for the distant or driving beam will be substantially coincident with the normal line of the upper limit of the distant or driving beam when the car is in unloaded position.

It is desirable in the combination disclosed to employ a reflector of the so-called long focal length type, the position of the filaments being such with respect to the reflector that the parametric or focal plane will pass substantially through the light emitting portion of the filaments. Utilizing a long focal length reflector of the character disclosed a "fore and aft" adjustment of the filaments with respect to the focal plane of the reflector has been found in practical use to be unnecessary, the headlamp being of the character known as the fixed focus reflector, not requiring horizontal longitudinal adjustment of the filaments. With headlamps of this character, it is desirable to employ lenses 22 having prismatic portions of varying angularity or gradation to not only control the rays projected from the portions of the reflector forward of the parameter but to build up a desirable projected light beam pattern.

Another embodiment of our invention is illustrated particularly in Figures 5 through 7 inclusive. In this embodiment the lamp bulb and the sources of light or filaments contained therein are maintained in a position corresponding to unloaded position of the car to produce the driving beam not having glare characteristics by means of the energization of the solenoid. In this embodiment when the vehicle is in loaded condition the headlamps are, as has been previously described, tilted upwardly and the light beams likewise thrown upwardly. To compensate for this condition, the filaments are moved upwardly with respect to the light projecting means by de-energizing the solenoid, permitting a spring or other element to move the lamp bulb and filaments to a position lowering the light beams.

This arrangement in detail resides in the headlamp 20' supporting a long focal length reflector 21', a front lens 22' preferably provided with horizontally disposed prisms of varying gradation, and a bezel ring 23', substantially similar in construction to the arrangement previously described in Figure 1 hereof. The lamp socket 26' carrying the lamp bulb 30' within which are positioned filaments 31' and 32' is pivotally supported upon projecting ears 60 forming an integral part of a U-shaped bracket 61, the latter in turn riveted as at 62 to the reflector or otherwise suitably secured thereto. Depending from an extending portion 64 of braket 61 is a solenoid 65 having a cooperative armature 67 which is flexibly pivoted to bracket 61 by means of a strip of comparatively thin material as at 68, the strip 68 being fabricated of spring copper or other flexible material. Struck up from the bracket 61 are integral projections 70 and 71, the projections 70 terminating adjacent the armature 67 and acting as a stop member to limit the lowermost position of the armature, the stop member 71 serving to define the position of the socket member 26' when the latter is moved to the position shown in full lines in Figure 5. It should be noted that stop members 70 and 71 may be bent or distorted to regulate or limit the movements of the lamp socket and armature. Secured to the rear extremity of the socket member 26' is a substantially hook-like member 73, the extremity of which embraces the end of the armature 67 so that energization of the solenoid 65 acts to lift the armature 67 and member 73 thus moving the socket 26' and lamp bulb 30' to the position shown in full lines in Figure 5. The lower portion of bracket 61 is formed with a lateral extension 74, the latter having a threaded opening to receive a screw 75 acting to define the other limit of movement of the socket 26' and bulb 30'. A coil spring 76 connecting the rear extremity of the socket 26' and the projection 74 formed on bracket 61 acts to constantly urge the socket 26' and lamp bulb 30' to the position indicated by dotted lines in Figure 5. Suitable connections 77, 78 and 79 are made to the lamp filaments and the solenoid respectively for energizing at will either set of filaments or the solenoids.

The operation of the embodiment of the invention illustrated in Figures 5 through 7 inclusive is similar in operation to the form shown in Figures 1 to 4 inclusive. It is preferable that the headlamp assembly be positioned with respect to the car in unloaded condition so as to be tilted slightly downwardly, the initial position of the filaments being arranged with respect to the focal axis of the reflector such that a substantially horizontal driving beam is obtained which will not cause glare in the eyes of approaching drivers, the filament positioning in this condition being particularly shown in Figure 6 with the solenoid energized, where it is noted that the reflector axis is angularly arranged with respect to a line representing a parallel position with respect to the roadway. It can be seen that with the solenoid energized as shown in Figure 6 with the car in a substantially unloaded condition the light emanating from the filament 32' and being projected by the reflector 21' produces a satisfactory driving beam, while the light emanating from the filament 31' projected from the reflector produces the depressed beam. Should the car become loaded, the de-energization of solenoid 65 may be accomplished by manual or other operation of the circuit closing device, the spring 76 operating upon the secession of pull of the solenoid upon the armature 67 to move the socket 26' and lamp bulb 30', filaments 31' and 32' to the position indicated in Figure 7. After the filaments have become elevated with respect to the reflector 21', the light emanating from the filament 32' forming the driving beam is slightly lowered over the position of the beam which would normally be projected from the reflector with the filaments positioned as shown in Figure 6. As the beam position with a loaded car becomes higher, the beam emanating from the filament 32' in Figure 7 will produce a beam so that it will not produce glare in the eyes of approaching drivers. In this position the lamp bulb 30' and the filaments are definitely moved to a fixed location determined by the position of the stop screw 75 the bulb being held in the position under the constant contractile force of spring 76. It is obvious that in the foregoing described embodiment of the invention the solenoid will be energized to position the lamp bulb and filaments when the car is in substantially unloaded condition and that the solenoid is de-energized to reposition the filaments to compensate for a loaded condition in the car, changing the direction of the light beams.

Means forming a part of the invention resides in an arrangement for automatically energizing and deenergizing a circuit for changing the position of the filaments dependent upon a load factor of the vehicle. One embodiment of this arrangement is particularly illustrated in Figure 8 wherein numeral 100 designates a body portion of a vehicle as for example, the rear portion of a body of a multi-passenger vehicle. The seat portion 102 is preferably carried by a plurality of resilient members or springs 103 interposed between a lower plate 105 of the seat portion and a transversely extending bar 106. Slidably positioned in openings in the bar 106 are cylindrical movable contact members 108 which may be carried by spring plates 109 also secured to the bar 106 or other suitable supporting member. Interposed between the cylindrical contacts 108 and the plate 105 of the seat 102 are coil springs 111 urging the contacts 108 to a predetermined position, springs 111 being insulated from bar 105 by means of insulating plates 114. Positioned beneath bar 106 is a second member or bar 112 carrying stationary contacts 113 normally in alignment with contacts 108 but out of engagement therewith. The sets of contacts 108 and 113 are connected in parallel with each other and arranged so that when either of the contacts 108 engages its respective stationary contact 113, the solenoids of the bulb shifting mechanism hereinbefore described for changing the direction of the light beams are energized. The circuit may, as desired, include a manually operated switch 115 supplementing the contact switches formed by contacts 108 and 113. If desired, a switch 116 may be interposed in the circuit, this switch being actuated by the ignition controlling means so as to render the solenoid circuit ineffective when the engine of the vehicle is not in operation.

In the operation of this arrangement assuming that there is no abnormal load upon the seat portion 102 of the vehicle, both movable contacts 108 will be out of engagement with the stationary contacts 113 so that no energization of the solenoids will take place. In event that a load is placed upon the seat portion 102, assuming that the switches 115 and 116 are in closed position, the springs 103 will be expanded, seat portion 102 will move downwardly carrying therewith plate 105 and under the influence of the coil springs 111 one or both of the movable contacts 108 will be moved into engagement with stationary contacts 113. Thus, the solenoids will be energized to shift the position of the filaments and the lamp bulb supporting the same. When the load is removed from the seat portion 102, the springs 103 move the seat portion upwardly thus affecting a desired disengagement of contacts 108 with stationary contacts 113 to de-energize the solenoid circuit affecting a switching of the filaments to the other position as is hereinbefore described. This automatic switching arrangement has particular adaptability with the forms of the invention disclosed in Figures 1 through 4 inclusive of the drawings wherein energization of the solenoids moves the filaments to one position and de-energization of the solenoids moves the filaments to another position.

It is apparent that, within the scope of the invention, modifications and different arrangements may be made other than is herein disclosed, and the present disclosure is illustrative merely, the invention comprehending all variations thereof.

We claim:

1. In combination with an automotive vehicle; a lamp bulb; a plurality of light sources in said bulb; light projecting means associated with said light sources for producing light beams having definite directional characteristics, and means for changing the position of said lamp bulb with respect to the light projecting means for compensating changes in the static relative position of the vehicle for effecting a change in the direction of the light beams produced, said means being controlled by a load receiving member located within the vehicle body.

2. In combination with an automotive vehicle, a headlamp casing carried by said vehicle; a lamp bulb carried by said casing, said lamp bulb containing a plurality of independently usable light sources; a reflector carried by said casing; a lamp socket carried by said reflector, said lamp socket supporting said light bulb; means for urging said socket to one position, whereby the light sources in conjunction with the reflector produce beams having predetermined different directional characteristics at or below a predetermined horizontal plane; and electrically energized automatic means for changing the position of said light socket and lamp bulb with respect to said reflector to compensate for changes in the projected light beam with respect to said horizontal plane resulting from changes in the relative position of said vehicle due to variations in load of said vehicle, said means being actuated when the initial position of a seating element within the vehicle body is changed under load.

3. In a headlighting system for automotive vehicles, the combination of a lamp casing fixedly secured to the vehicle; a reflector mounted in said casing; a lamp bulb containing a plurality of light sources associated with said reflector, said light sources being selectively energizable for producing driving and depressed beams; means for shifting the position of said lamp bulb and said light sources relative to said reflector thereby changing the direction of said light beams, said means including an element adapted to be electrically energized from a remote position located within the vehicle body and dependent upon a load responsive element to shift the light sources to one position with respect to the reflector; mechanical means for shifting the lamp bulb and light sources to another position and means for adjustably limiting the movement of said lamp bulb when urged to a position under the influence of said mechanical means.

SAMUEL F. ARBUCKLE.
GUY H. COULTER.